United States Patent
Kaye et al.

(10) Patent No.: US 11,870,092 B1
(45) Date of Patent: Jan. 9, 2024

(54) ON-BOARD VENT GAS ABATEMENT

(71) Applicant: Apple Inc., Cupertino, CA (US)

(72) Inventors: Steven Kaye, Oakland, CA (US); Luke Asher Wilhelm, San Jose, CA (US); Josef L. Miler, San Francisco, CA (US); Alexander J. Clarabut, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/885,126

(22) Filed: Jan. 31, 2018

Related U.S. Application Data

(60) Provisional application No. 62/453,078, filed on Feb. 1, 2017.

(51) Int. Cl.
| | |
|---|---|
| *H01M 10/42* | (2006.01) |
| *H01M 10/52* | (2006.01) |
| *H01M 50/325* | (2021.01) |
| *H01M 10/058* | (2010.01) |
| *H01M 50/308* | (2021.01) |
| *H01M 10/0525* | (2010.01) |

(52) U.S. Cl.
CPC ....... *H01M 50/325* (2021.01); *H01M 10/058* (2013.01); *H01M 10/425* (2013.01); *H01M 10/523* (2013.01); *H01M 50/308* (2021.01); *H01M 10/0525* (2013.01)

(58) Field of Classification Search
CPC ............. H01M 2/1229; H01M 10/058; H01M 10/523; H01M 2/1217; H01M 10/425; H01M 10/0525
USPC .......................................................... 429/59
See application file for complete search history.

(56) References Cited

U.S. PATENT DOCUMENTS

| | | |
|---|---|---|
| 3,053,435 A | 9/1962 | Sanders et al. |
| 6,278,259 B1 | 8/2001 | Kimoto et al. |
| 8,956,747 B2 | 2/2015 | Itoi et al. |
| 10,923,788 B1 | 2/2021 | Loveness et al. |
| 11,296,380 B2 | 4/2022 | Miler et al. |
| 11,296,381 B2 | 4/2022 | Miler et al. |
| 11,469,471 B1 | 10/2022 | Miler et al. |
| 2004/0069474 A1 | 4/2004 | Wu et al. |
| 2006/0127765 A1* | 6/2006 | Machida ............... H01M 4/13 429/217 |
| 2006/0172187 A1 | 8/2006 | Ambrosio et al. |

(Continued)

FOREIGN PATENT DOCUMENTS

| | | |
|---|---|---|
| CN | 2601463 Y | 1/2004 |
| CN | 101326657 A | 12/2008 |

(Continued)

OTHER PUBLICATIONS

U.S. Appl. No. 15/703,114, "Non-Final Office Action", dated Aug. 22, 2019, 20 pages.

(Continued)

*Primary Examiner* — Christian Roldan
(74) *Attorney, Agent, or Firm* — Kilpatrick Townsend & Stockton LLP

(57) ABSTRACT

Energy storage systems, battery cells, and batteries of the present technology may include an abatement system for addressing effluent vapors produced by a cell block. The systems may include support structures configured to address vented effluents, and may include oxidants, catalysts, or entrainment systems to assist with the abatement.

11 Claims, 4 Drawing Sheets

(56) References Cited

U.S. PATENT DOCUMENTS

| | | | |
|---|---|---|---|
| 2009/0274952 A1 | 11/2009 | Wood et al. | |
| 2009/0325054 A1 | 12/2009 | Payne et al. | |
| 2010/0055556 A1* | 3/2010 | Meschter | H01M 2/1077 |
| | | | 429/159 |
| 2010/0136391 A1 | 6/2010 | Prilutsky et al. | |
| 2010/0279152 A1 | 11/2010 | Payne | |
| 2010/0316894 A1 | 12/2010 | Hermann et al. | |
| 2011/0020676 A1 | 1/2011 | Kurosawa | |
| 2011/0097620 A1 | 4/2011 | Kim | |
| 2011/0111273 A1 | 5/2011 | Okada et al. | |
| 2011/0130049 A1 | 6/2011 | Kaneshiro | |
| 2011/0135975 A1 | 6/2011 | Fuhr et al. | |
| 2011/0195284 A1* | 8/2011 | Yasui | H01M 50/30 |
| | | | 429/82 |
| 2012/0002338 A1 | 1/2012 | Smith et al. | |
| 2012/0082880 A1 | 4/2012 | Koetting et al. | |
| 2012/0148889 A1* | 6/2012 | Fuhr | H01M 10/6567 |
| | | | 429/87 |
| 2012/0194954 A1 | 8/2012 | Fukuyama et al. | |
| 2012/0231306 A1 | 9/2012 | Herron et al. | |
| 2013/0034755 A1 | 2/2013 | Kim | |
| 2013/0078488 A1 | 3/2013 | Nemoto et al. | |
| 2013/0236754 A1 | 9/2013 | Lim | |
| 2013/0295428 A1 | 11/2013 | Hatta et al. | |
| 2013/0302664 A1 | 11/2013 | Millon | |
| 2014/0023906 A1 | 1/2014 | Hashimoto et al. | |
| 2014/0162107 A1 | 6/2014 | Obrist et al. | |
| 2014/0302368 A1 | 10/2014 | Wang et al. | |
| 2014/0318106 A1* | 10/2014 | Mizuno | H01M 4/381 |
| | | | 60/301 |
| 2014/0329121 A1 | 11/2014 | Nishihara | |
| 2014/0363720 A1 | 12/2014 | Ackermann et al. | |
| 2015/0064514 A1* | 3/2015 | Wu | H01M 50/20 |
| | | | 429/120 |
| 2015/0118537 A1 | 4/2015 | Obasih et al. | |
| 2015/0194711 A1 | 7/2015 | Rawlinson | |
| 2015/0244036 A1 | 8/2015 | Lane et al. | |
| 2015/0280189 A1 | 10/2015 | Ohshiba et al. | |
| 2016/0020447 A1 | 1/2016 | Janarthanam et al. | |
| 2016/0036033 A1* | 2/2016 | Zhang | H01M 50/593 |
| | | | 429/53 |
| 2016/0093931 A1 | 3/2016 | Rawlinson et al. | |
| 2016/0099451 A1* | 4/2016 | Murai | H01M 50/20 |
| | | | 429/54 |
| 2016/0197385 A1 | 7/2016 | Matsumoto et al. | |
| 2016/0218336 A1* | 7/2016 | Herrmann | H01M 2/1252 |
| 2017/0162917 A1* | 6/2017 | Yu | H01M 10/054 |
| 2017/0170439 A1* | 6/2017 | Jarvis | H01M 50/578 |
| 2018/0138473 A1 | 5/2018 | Bessho et al. | |
| 2018/0183114 A1 | 6/2018 | Rittner et al. | |
| 2018/0294452 A1 | 10/2018 | Tan et al. | |
| 2019/0157635 A1 | 5/2019 | Miler et al. | |
| 2019/0157636 A1 | 5/2019 | Miler et al. | |
| 2019/0157729 A1 | 5/2019 | Yamashita | |
| 2019/0161909 A1 | 5/2019 | Oikawa et al. | |
| 2019/0181405 A1 | 6/2019 | Kim et al. | |
| 2019/0259996 A1 | 8/2019 | Fritz et al. | |
| 2019/0267682 A1 | 8/2019 | Seo et al. | |
| 2019/0363532 A1 | 11/2019 | Von Zur Muehlen et al. | |
| 2020/0067156 A1 | 2/2020 | Chi et al. | |
| 2020/0106075 A1 | 4/2020 | Yanagida | |
| 2020/0144576 A1 | 5/2020 | Yoshida et al. | |
| 2020/0161728 A1 | 5/2020 | Wang | |
| 2020/0220147 A1 | 7/2020 | Haino et al. | |
| 2021/0183607 A1 | 6/2021 | Schlaak et al. | |
| 2022/0111758 A1 | 4/2022 | Ijaz et al. | |
| 2022/0111759 A1 | 4/2022 | Ijaz | |
| 2022/0115897 A1 | 4/2022 | Ijaz | |
| 2023/0026549 A1 | 1/2023 | Ijaz et al. | |

FOREIGN PATENT DOCUMENTS

| | | |
|---|---|---|
| CN | 101483227 A | 7/2009 |
| CN | 101523637 A | 9/2009 |
| CN | 101627490 A | 1/2010 |
| CN | 102007619 A | 4/2011 |
| CN | 102054951 A | 5/2011 |
| CN | 103229326 A | 7/2013 |
| CN | 103579713 A | 2/2014 |
| CN | 203871442 U | 10/2014 |
| CN | 204243106 U | 4/2015 |
| CN | 105518899 A | 4/2016 |
| CN | 205177921 U | 4/2016 |
| CN | 105742535 A | 7/2016 |
| CN | 105789507 A | 7/2016 |
| CN | 208585211 U | 3/2019 |
| DE | 10049071 A1 | 4/2002 |
| DE | 102013015749 A1 | 3/2015 |
| DE | 102017118519 A1 | 2/2019 |
| EP | 1091438 A2 | 4/2001 |
| EP | 2262048 A1 | 12/2010 |
| EP | 2320493 A1 | 5/2011 |
| EP | 3346517 A1 | 7/2018 |
| JP | 2011175844 A | 9/2011 |
| JP | 2015002166 A | 1/2015 |
| WO | 2011134815 A1 | 11/2011 |
| WO | 2011134828 A1 | 11/2011 |
| WO | 2017017913 A1 | 2/2017 |
| WO | 2018022964 A1 | 2/2018 |
| WO | 2018023050 A1 | 2/2018 |
| WO | 2018207608 A1 | 11/2018 |
| WO | 2020134051 A1 | 7/2020 |
| WO | 2020134054 A1 | 7/2020 |
| WO | 2020134070 A1 | 7/2020 |
| WO | 2021088570 A1 | 5/2021 |

OTHER PUBLICATIONS

Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.

PCT/US2017/044316, "International Preliminary Report on Patentability", dated Feb. 7, 2019, 7 pages.

PCT/US2017/044316, "International Search Report and Written Opinion", dated Nov. 15, 2017, 10 pages.

PCT/US2017/044474, "International Preliminary Report on Patentability", dated Feb. 7, 2019, 9 pages.

PCT/US2017/044474, "International Search Report and Written Opinion", dated Oct. 24, 2017, 12 pages.

U.S. Appl. No. 15/703,114, "Final Office Action", dated Mar. 16, 2020, 22 pages.

U.S. Appl. No. 15/794,200, "Non-Final Office Action", dated Mar. 19, 2020, 23 pages.

U.S. Appl. No. 16/259,440, "Non-Final Office Action", dated Mar. 19, 2021, 12 pages.

U.S. Appl. No. 16/263,907, "Non-Final Office Action", dated Mar. 30, 2021, 12 pages.

U.S. Appl. No. 16/259,584, "Final Office Action", dated Jun. 7, 2021, 13 pages.

U.S. Appl. No. 15/794,200, "Notice of Allowance", dated Oct. 29, 2020, 8 pages.

U.S. Appl. No. 16/259,584, "Non-Final Office Action", dated Nov. 10, 2020, 16 pages.

U.S. Appl. No. 16/259,440, "Notice of Allowability", dated Dec. 9, 2021, 2 pages.

U.S. Appl. No. 16/259,440, "Notice of Allowance", dated Dec. 1, 2021, 7 pages.

U.S. Appl. No. 16/263,907, "Non-Final Office Action", dated Nov. 1, 2021, 11 pages.

China Patent Application No. 201910307710.1, "Office Action", dated Jul. 26, 2021, 17 pages.

China Patent Application No. 201910339097.1, "Office Action", dated Jun. 29, 2021, 17 pages.

U.S. Appl. No. 15/703,114, "Final Office Action", dated Aug. 11, 2022, 22 pages.

U.S. Appl. No. 15/703,114, "Non-Final Office Action", dated Dec. 17, 2021, 24 pages.

(56) References Cited

OTHER PUBLICATIONS

U.S. Appl. No. 16/259,584 , "Notice of Allowance", dated Dec. 10, 2021, 12 pages.
U.S. Appl. No. 16/263,907 , "Corrected Notice of Allowability", dated Sep. 9, 2022, 2 pages.
U.S. Appl. No. 16/263,907 , "Notice of Allowance", dated Jun. 1, 2022, 8 pages.
U.S. Appl. No. 16/711,829 , "Final Office Action", dated Jul. 28, 2022, 24 pages.
U.S. Appl. No. 16/711,829 , "Non-Final Office Action", dated Feb. 4, 2022, 19 pages.
U.S. Appl. No. 17/175,270 , "Non-Final Office Action", dated Mar. 17, 2022, 11 pages.
U.S. Appl. No. 17/175,270 , "Notice of Allowability", dated Aug. 31, 2022, 2 pages.
U.S. Appl. No. 17/175,270 , "Notice of Allowance", dated Jun. 28, 2022, 8 pages.
China Patent Application No. 201910307710.1 , "Office Action", dated Mar. 2, 2022, 20 pages.
China Patent Application No. 201910339097.1 , "Office Action", dated Apr. 12, 2022, 17 pages.
China Patent Application No. 201910339097.1 , "Office Action", dated Jun. 24, 2022, 10 pages.
PCT/US2021/053553 , "International Search Report and Written Opinion", dated Jan. 20, 2022, 12 pages.
PCT/US2022/042877 , "International Search Report and the Written Opinion", dated Jan. 2, 2023, 13 pages.
U.S. Appl. No. 17/077,259 , "Non-Final Office Action", dated Oct. 6, 2022, 16 pages.
U.S. Appl. No. 17/175,270 , "Corrected Notice of Allowability", dated Oct. 13, 2022, 2 pages.
U.S. Appl. No. 17/317,849 , "Non-Final Office Action", dated Oct. 6, 2022, 15 pages.
U.S. Appl. No. 17/318,174 , "Non-Final Office Action", dated Oct. 14, 2022, 13 pages.
U.S. Appl. No. 17/318,182 , "Non-Final Office Action", dated Oct. 6, 2022, 14 pages.
U.S. Appl. No. 17/318,188 , "Non-Final Office Action", dated Oct. 6, 2022, 16 pages.
China Patent Application No. 201910307710.1 , "Notice of Decision to Grant", dated Sep. 20, 2022, 6 pages.
China Patent Application No. 201910339097.1 , "Office Action", dated Oct. 8, 2022, 7 pages.
International Patent Application No. PCT/US2021/053553, International Preliminary Report on Patentability, dated May 4, 2023, 8 pages.
U.S. Appl. No. 17/318,174, Final Office Action, dated Feb. 16, 2023, 15 pages.
U.S. Appl. No. 17/448,756, Non-Final Office Action, dated Feb. 1, 2023, 23 pages.
U.S. Appl. No. 17/452,683, Non-Final Office Action, dated Mar. 21, 2023, 14 pages.
Gunther, Machine Translation of DE 102017118519 A1, 2017, 35 pages.
International Patent Application No. PCT/US2022/042873, International Search Report and Written Opinion, dated Jan. 5, 2023, 13 pages.
Zhongke et al., Machine Translation of CN 208585211 U, 2019, 28 pages.

* cited by examiner

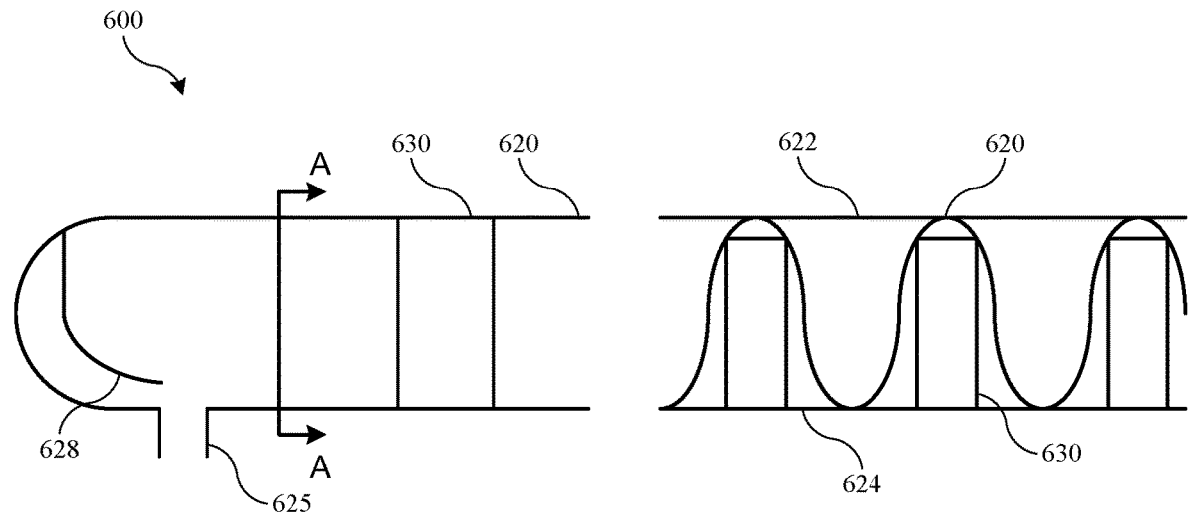
FIG. 6A  FIG. 6B
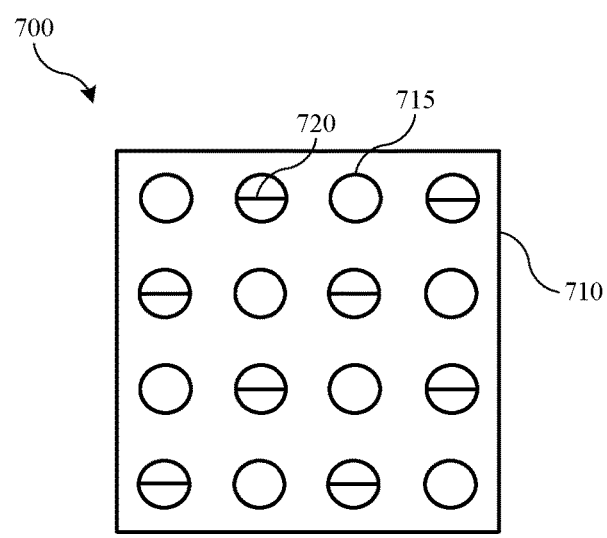
FIG. 7

ON-BOARD VENT GAS ABATEMENT

CROSS-REFERENCE TO RELATED APPLICATION

This application claims the benefit of and priority to U.S. Provisional Application No. 62/453,078, filed Feb. 1, 2017, entitled "ON-BOARD VENT GAS ABATEMENT". The disclosure of which is incorporated by reference in its entirety.

TECHNICAL FIELD

The present technology relates to venting systems and components. More specifically, the present technology relates to on-board venting for battery systems.

BACKGROUND

A battery cell that is under abuse or abnormal ("fault") conditions may vent gas and battery internal materials.

SUMMARY

The present technology relates to energy storage devices and systems, including battery cells, battery cell blocks, and batteries, which may include lithium-ion batteries. These systems may include structural components and materials to dilute, adsorb, react with, or otherwise address vented effluents from a battery cell or cell block. The systems may include many different features, designs, and material configurations as will be described throughout the disclosure.

Energy storage systems, battery cells, and batteries of the present technology may include a battery cell block. The systems may include a vent defined beneath the battery cell block, and the vent may be configured to receive effluent vapors, such as may be produced by a battery cell. The systems may include a support structure configured to contain the battery cell block. The systems may also include a plenum defined by the support structure beneath the battery cell block. The systems may also include an oxidant located within the plenum.

The battery system or energy storage system vent may be configured to release the effluent vapors to the plenum in a defined path configured to direct the effluent vapors to the oxidant. The vent may include a hinged release configured to release at a defined pressure or temperature and deliver the effluent vapors into a defined path of the plenum. In embodiments, the oxidant may be or include a metal oxide. In some configurations, the oxide may line at least a base of the plenum. The plenum may define a path from the vent defined beneath the battery cell block to an outlet, and the path may be characterized by a length of at least about 1 m. The oxidant may be located within the plenum along the path, and in embodiments the effluent vapors may be flammable. In some embodiments, the oxidant may be configured to react with the effluent to produce a non-flammable effluent at the outlet. The oxidant may be configured to interact with the effluent vapors at a temperature greater than or about 150° C. The oxidant may be characterized by a surface area greater than or about 200 m$^2$/g. In some embodiments, the oxidant may be configured to reduce a carbon monoxide concentration within the effluent vapors from above or about 1000 ppm to below or about 100 ppm.

The present technology additionally encompasses battery systems and energy storage systems that may include a battery cell block. The systems may include a vent associated with the battery cell block. The vent may be configured to receive effluent vapors from the battery cell block. The systems may include a support structure configured to contain the battery cell block. The systems may also include an oxidant contained within a vessel in fluid communication with the vent.

In exemplary systems, the vessel may be positioned within or adjacent to the battery cell block. The systems may also include a channel defined between the battery cell block and the vessel. In some embodiments, the channel may be configured to deliver effluent vapors from the battery cell block to the vessel. The vessel may include a sealed vessel including a barrier between the vessel and the battery cell block. The barrier may include a temperature or pressure release barrier. The oxidant may include multiple oxidants included within the vessel in some embodiments. A first oxidant may be included within the vessel proximate a fluid entrance to the vessel. The first oxidant may be configured to increase the temperature of the effluent vapors on interaction with the first oxidant. The systems may also include a plenum, and the vessel may be positioned proximate an outlet from the plenum. In some embodiments, the vessel may include at least one structural member in contact with the vessel. The at least one structural member may be configured to dissipate heat from the vessel structure.

The present technology also includes battery systems and energy storage systems that may include a battery cell block. The systems may include a vent defined at an external portion of the battery cell block. The vent may be configured to receive effluent vapors from the battery cell block. The systems may include a support structure configured to contain the battery cell block. The systems may also include a plenum defined by the support structure beneath the battery cell block. The plenum may include an intake configured to dilute the effluent vapors with an oxygen-containing fluid.

The systems may further include a catalytic material included within the plenum. In embodiments, the plenum may include a first section and a second section, and the first section may define a portion of the plenum in fluid contact with the vent. The second section may be defined in a fluid path extending from the first section. In some embodiments, the intake may be positioned between the first section and the second section. The intake may be configured to provide the oxygen-containing fluid to the effluent vapors. In some embodiments, a catalytic material may be included within the second section. The second section may define a plurality of exit ports from the plenum in embodiments. The systems may also include an ignition device configured to ignite the effluent vapors proximate the exit ports.

BRIEF DESCRIPTION OF THE DRAWINGS

A further understanding of the nature and advantages of the disclosed embodiments may be realized by reference to the remaining portions of the specification and the drawings.

FIG. 6A shows a schematic partial cross-sectional view of a plenum structure according to embodiments of the present technology.

FIG. 6B shows a schematic cross-sectional view along line A-A from FIG. 6A according to embodiments of the present technology.

FIG. 7 shows a schematic plan view of an outlet structure according to embodiments of the present technology.

Figure 1:
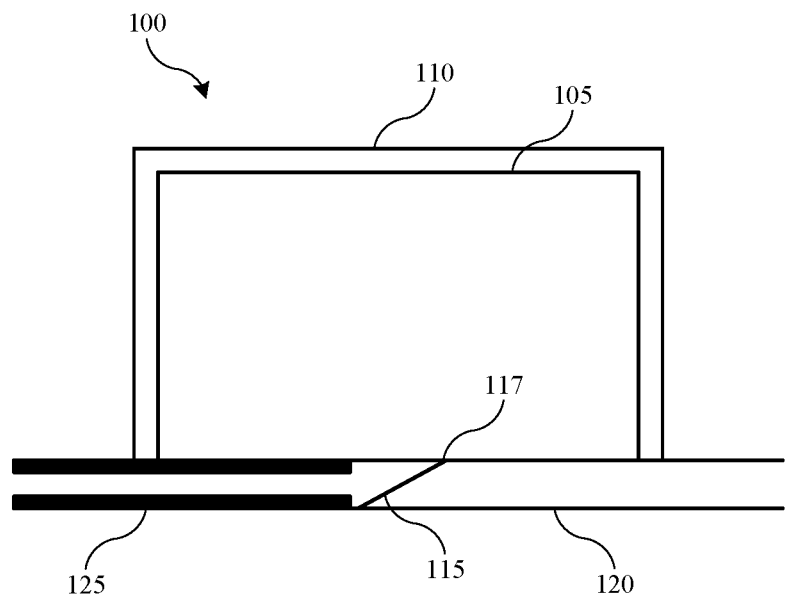
FIG. 1 shows a schematic cross-sectional view of an energy storage system according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Energy storage devices and systems may include multiple batteries or battery cell blocks, as well as associated components. Cells or cell blocks may experience events including puncture and other events that may cause effluent vapors to be released. These vapors may be released at high temperature or pressure. If not diverted or released, in multiple battery cell or block systems, the heat generated and released with the vapors may extend to additional cell blocks, which may cause further device failure.

Conventional systems may include vents and additional release mechanisms for both containing the generated effluents, as well as delivering or channeling them from the system. Depending on the materials used within the battery, including for the electrolyte as well as the electrode materials, the effluent vapors may include flammable or otherwise undesirable materials.

The present technology controls the release of these effluent materials as well as abates the material effects. For example, with oxidants, catalysts, diluents and other materials, contaminant levels within the effluent vapors may be reduced before the effluent vapors are released from the system itself. By performing the abatement within the system, the materials released from the system may be rendered in a more environmentally-friendly manner. Unlike conventional oxidation materials which may oxidize a small amount of a material, the present technology may oxidize a greater amount of one or more components in a limited area within the system.

Although the remaining portions of the description will routinely reference lithium-ion batteries, it will be readily understood by the skilled artisan that the technology is not so limited. The present designs may be employed with any number of battery or energy storage devices, including other rechargeable battery types as well as non-rechargeable designs. Moreover, the present technology may be applicable to batteries and energy storage devices used in any number of battery-powered or battery-equipped technologies. Accordingly, the disclosure and claims are not to be considered limited to any particular example discussed, but can broadly be utilized with any number of devices that may exhibit some or all of the electrical, thermal, or chemical characteristics of the discussed examples. For example, many of the components, arrangements, and systems of the present technology may be utilized in any apparatus or system in which effluent release may occur or abatement may be desired.

FIG. 1 shows a schematic cross-sectional view of an energy storage system 100 according to embodiments of the present technology. Exemplary energy storage system 100, which may be or include a battery system, includes a battery cell block 105. Cell block 105 includes one or more battery cells in embodiments, and the battery cells may be contained within a housing that may include other components including insulation, electronics, and other devices that may be included within an energy storage system, such as a battery, for example. The battery cells of cell block 105 may be coupled in series or in parallel, and may be used to provide energy to an apparatus or system in which cell block 105 is included. The battery cells may include a variety of materials including nickel-rich materials such as lithium nickel cobalt aluminum oxide or lithium nickel manganese cobalt, or cobalt-rich materials such as lithium cobalt oxide, as well as other materials. During a fault condition, heat and or pressure may build within the battery cell block, causing the battery cell to release effluent vapors. Although the following description may reference effluent vapors, materials including liquids, solid particulates, and other materials may be included in the effluent vapors, and thus the effluent vapors are not to be considered limited to gases alone. This heat and vapor release may cause structural damage to any of the plurality of battery cells of the cell block 105, as well as to the cell block itself, and may transfer generated heat to surrounding components. Surrounding components may include other cell blocks as well as other system components of the device in which the cell block 105 is included. These components may be sensitive to heat, and thus management of the effluent vapors before the vapors cause surrounding heat damage is beneficial.

Energy storage system 100 includes a housing or support structure 110 that contains the battery cell block 105. The support structure may include a plurality of cell blocks, which may be separated by structural elements, or may be contained in any of a variety of configurations. Each battery cell of cell block 105 may have one of more vents, such as pressure-release valves, that may allow effluent vapors to be released from the cell, as well as from cell block 105. Cell block 105 may have individual vents for each included cell, or may have one release vent in fluid communication with each included cell. For example, each cell may include a release vent or valve that may allow the release of effluents into the battery cell block 105. The battery cell block 105 may have one or more additional vents or release valves configured to release effluent vapors from the battery cell block 105 into the support structure 110. The support structure 110 may be configured to contain the effluent vapors for a period of time before the effluent vapors are released to an external environment. For example, as explained further below, the support structure 110 may contain the effluent vapors to allow an abatement process to be performed before the effluent vapors are released.

In some embodiments the battery cell block 105 or the support structure 110 includes a vent 115 positioned beneath the battery cell block 105. Vent 115 may be configured to receive the effluent vapors from the battery cell block 105 or from the individual cells contained therein. Vent 115 may direct the effluent vapors into the support structure 110. For example, vent 115 may direct effluent vapors into a defined space such as plenum 120. Plenum 120 may be defined by a portion of support structure 110, and may be positioned or located below battery cell block 105. In other embodiments, plenum 120 may also be defined along sidewalls of the battery cell block 105. Within the plenum 120 may be a material 125, which in embodiments may be an oxidant. Material 125 may be configured to interact or react with effluent vapors released from battery cell block 105 before the effluent vapors are released from the energy storage system 100 to a surrounding environment, such as the external atmosphere, for example. The following example may help to further explain energy storage system 100, but is not intended to limit the claimed technology.

When a battery cell experiences a fault, such as by short circuit, mechanical breach, overheating, overcharging, etc., the device may begin to cause reactions within the cell that produce effluent vapors. In lithium-ion battery cells these reactions are exothermic, which can further effluent production, as well as increase heat and pressure within the cell. Once a pressure threshold is reached that either overcomes the cell wall integrity or a temperature or pressure vent, the produced effluents may be released from the cell. The chemical makeup of the effluents may be based or influenced by the materials included within the cell, but majority components may include carbon dioxide, carbon monoxide, hydrogen, and various hydrocarbons including methane, ethane, and ethylene.

In some embodiments, the plenum 120 may provide a path through which the effluent vapors are directed. The plenum may be an air-filled space within the structure, or may be purged or charged with an alternative vapor to provide an inert environment, or a more reactive environment. The plenum may provide sufficient contact with material 125 to allow the abatement to occur before the effluent vapors exit the system. Vent 115 may additionally define a portion of the path, or provide additional directionality to the fluid path of the effluent vapors. For example, vent 115 may be configured to open or release the effluent vapors to the plenum 120 in a defined path configured to direct the effluent vapors to or towards the material 125. Vent 115 may be any type of vent, such as a pressure-release valve or barrier, and may also be an element of support structure 110 that is configured to release at a defined temperature or pressure. For example, as illustrated, vent 115 may be a portion of support structure 110 or battery cell block 105 that may be coupled with support structure 110 or plenum 120 by a hinge 117 or other coupling that allows movement or flexing while maintaining a connection to the surrounding support structure. A release portion of vent 115 may release at a defined pressure or temperature that opens vent 115 at a first end opposite the end with hinge 117. Vent 115 may rotate at hinge 117 to provide a directed or defined flow path for effluent vapors towards material 125. Vent 115 may be of any size within support structure 110, and may be sized to provide a directed flow of effluent vapors into plenum 120.

Material 125 may be any material configured to react or interact with effluent vapors produced by battery cell block 105. Material 125 may include one or more components including oxidants, catalysts, diluents, or other materials that may react or interact with the effluent vapors, and are discussed here and elsewhere in the present disclosure. Oxidants that may be used in material 125 may include any metal oxide including transition metal oxides, p-block metal or metalloid oxides, as well as other materials that may provide similar characteristics or reactive effects as metal oxides. Exemplary oxides that may be included, but not to be considered limiting, include manganese oxide, copper oxide, iron oxide, nickel oxide, as well as multi-metal oxides including, for example, potassium permanganate, and other oxides of combinations of metals. The oxidants that may be used as material 125 may include combinations or alloys of metal oxides, such as a combination of manganese oxide and copper oxide, for example, in any combination, including Hopcalite I and Hopcalite II. The combinations may be determined based on reactive properties, costs, effluent vapor composition, and any other variable that may affect the combination chosen.

The oxidant may be included within the plenum 120 or other portions of the support structure, and in embodiments may be lined, formed, or positioned along the plenum on one or more surfaces. For example, the oxidant may be lined on a single surface of the plenum, such as on a floor or base of the plenum, or may be deposited on multiple surfaces including all exposed surfaces. The amount of oxidant included may be determined based on the amount of battery materials or the amount of possible output effluents in the battery cell block 105. The oxidant may be reactive with one or more materials including carbon monoxide, hydrogen, and/or one or more hydrocarbons. The oxidant may be configured to react with the effluent vapors at any temperature from a release temperature to ambient temperature. The effluent vapors may be released from the battery cell block at temperatures above 500° C. or lower, and the oxidant may react with the effluent vapors at any elevated temperatures.

The reactivity of the oxidant may be in part proportional to the temperature, or may have a threshold temperature based on the amount of oxidant and configuration to provide sufficient abatement for the effluent vapors. For example, the oxidant may be configured to react with the effluent vapors at temperatures above or about 700° C., below or about 700° C., below or about 600° C., below or about 500° C., below or about 400° C., below or about 300° C., below or about 250° C., below or about 200° C., below or about 150° C., below or about 100° C., or lower in embodiments. The oxidant may be configured to react at any temperature greater than the stated temperatures, such as greater than or about 150° C., or any range of temperatures between any stated temperatures or lesser range within any of the stated ranges. Additionally, a path along the plenum, heating elements, or any other configurations may be used to maintain a temperature above a threshold temperature to assist the reaction. However, in some embodiments, the temperature at which the effluent vapors are released, along with the path through the plenum and the amount of oxidant in the path, may be sufficient to maintain the temperature above a threshold until the effluent vapors exit the plenum.

The oxidant included with or as material 125 may be formed in a variety of structures to provide a suitable amount of surface area for reaction. For example, the oxidant may line a surface of the plenum or may be incorporated as a structure though which the effluent vapors may flow. The oxidant may also be included in a textured or graded distribution, such as with a thicker or heavier distribution at or proximate the location of vent 115. As a liner along one or more surfaces of the plenum, the oxidant may be distributed to provide a certain amount of coverage. Additionally, the oxidant may be characterized by a surface area of greater than or about 50 m$^2$/g. The oxidant may be characterized by a surface area of greater than or about 100 m$^2$/g, greater than or about 125 m$^2$/g, greater than or about 150 m$^2$/g, greater than or about 175 m$^2$/g, greater than or about 200 m$^2$/g, greater than or about 225 m$^2$/g, greater than or about 250 m$^2$/g, greater than or about 275 m$^2$/g, greater than or about 300 m$^2$/g, greater than or about 325 m$^2$/g, greater than or about 350 m$^2$/g, greater than or about 375 m$^2$/g, greater than or about 400 m$^2$/g, or greater depending on a variety of characteristics including the temperature of the reaction performed, where a higher surface area may provide an increased reaction rate at lower temperatures, and other factors understood to contribute to the determination.

Figure 2:
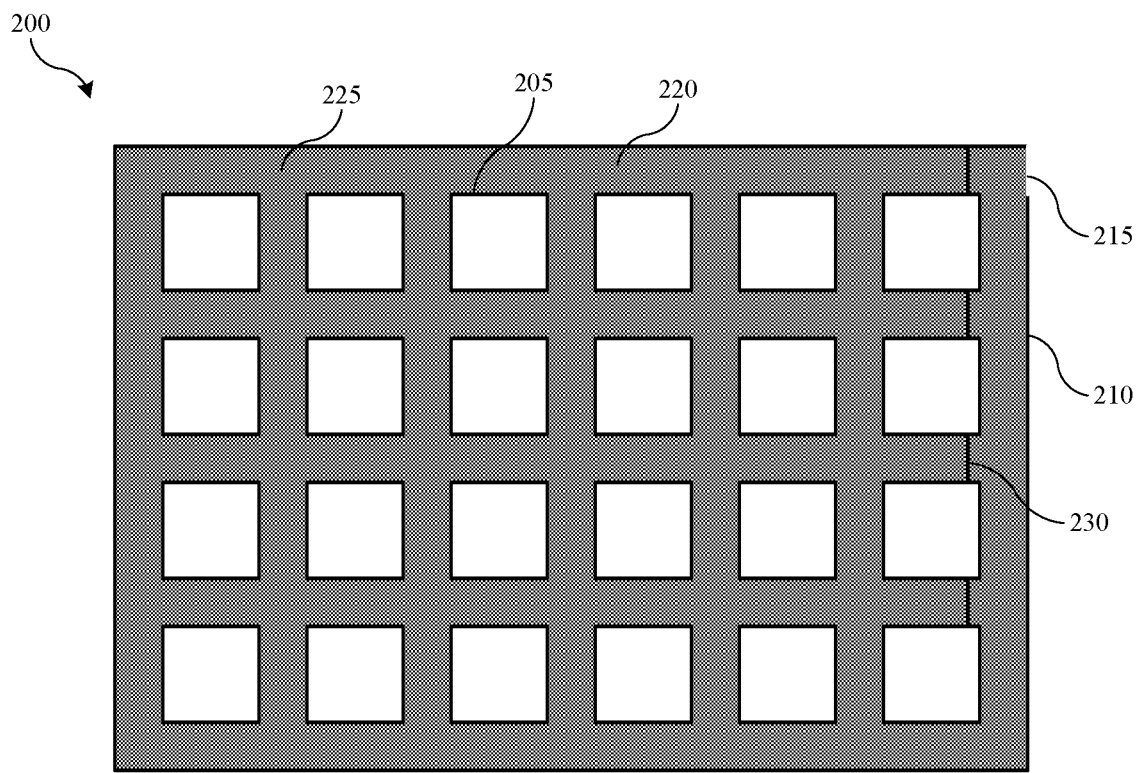
FIG. 2 shows a schematic top plan view of an energy storage system according to embodiments of the present technology.

Turning to FIG. 2 is shown a schematic top plan view of an energy storage system 200 according to embodiments of the present technology. Energy storage system 200 may include a plurality of cell blocks 205, which may each include one or more cells. Energy storage systems of the present technology may have or include any number of cell blocks, such as less than or about 5, greater than or about 5, greater than or about 10, greater than or about 20, greater than or about 30, greater than or about 50, greater than or about 70, greater than or about 100, greater than or about 150, greater than or about 300, or more depending on the amount of energy required for an application. Cell blocks 205 may be contained or distributed within a support structure 210. Support structure 210 may include a variety of components for supporting not only the cell blocks 205, but any associated equipment for the system. For example, support structure 210 may include cooling equipment, equipment for managing the cell blocks or energy to or from the cell blocks, or devices that receive power from any of the cell blocks. Accordingly, support structure 210 may take on any number of geometries and forms depending on the application, and should not be considered limited to the structure shown for illustrative purposes.

Support structure 210 may include or define a plenum 220, which may be similar to plenum 120 discussed above, and may include any of the aspects of that design. Plenum 220 may be located below the cell blocks 205, and may be configured to deliver effluent vapors received from a cell block to an outlet 215. Outlet 215 may be an outlet from the plenum 220, support structure 210, as well as the device or system in which energy storage system 200 is included. Plenum 220 and support structure 210 may contain any received effluent vapors within the support structure 210 to limit release to outlet 215, or any number of other outlets included within the support structure 210.

Plenum 220 may be lined with an oxidant material 225 on any surface, such as a base of plenum 220. Oxidant material 225 may be any of the oxidants or materials previously discussed, or any combination of materials. Plenum 220 may also include one or more partitions 230 in some embodiments. Partitions 230 may be any number of structures or obstructions within the plenum to create or define a flow path within the plenum 220 and support structure 210. Partitions 230 are illustrated in one possible configuration that may create a flow path to create a certain length of flow from any particular cell block 205 prior to distribution to outlet 215. It is to be understood that any other amount or configuration of partitions 230 is also encompassed by the present technology. Partitions 230 may be included in any configuration to create one or more flow paths through the plenum, which may enable a certain amount of interaction between oxidant material 225 and any received effluent vapors. In some embodiments, partitions 230 may be included to define a minimum path length through the plenum from a vent or outlet from any particular cell block.

For example, a fluid path defined by or within the plenum beneath or about the cell blocks 205 may have any minimum length. In embodiments, the fluid path may be characterized by a length from any cell block 205 to the outlet 215 of at least about 0.5 m. The fluid path may also be characterized by a length from any cell block 205 of greater than or about 1 m, greater than or about 2 m, greater than or about 3 m, greater than or about 4 m, greater than or about 5 m, greater than or about 6 m, greater than or about 7 m, greater than or about 8 m, greater than or about 9 m, greater than or about 10 m, or greater depending on the size of the energy storage system 200 and the configuration of partitions within the support structure.

The oxidant 225 may be distributed within the support structure 210 and the path length may be defined to provide a certain amount of interaction or reaction with any produced effluent vapors. For example, the energy storage system 200 may be configured to reduce or remove one or more components from the effluent vapors produced from any particular battery cell block 205 up to the entire array of cell blocks within the system. In some embodiments, the materials and configuration may be provided to produce a fluid path including an amount of oxidant to reduce flammability of effluent exiting system 200. In some embodiments, the materials and configuration may be provided to produce a fluid path including an amount of oxidant to reduce components from effluent exiting system 200, such as hydrogen, methane, or other hydrocarbons or materials.

The amount of reduction may be based on the component concentration, or may be based on a fraction of the total effluent. For example, the effluent vapors may include a concentration of hydrogen that is greater than or about 500 ppm, and may be greater than or about 600 ppm, greater than or about 700 ppm, greater than or about 800 ppm, greater than or about 900 ppm, greater than or about 1000 ppm, greater than or about 1200 ppm, or greater. The oxidant 225 and flow path from a battery cell block 205 to the outlet 215, may be configured to reduce a concentration of hydrogen below or about 500 ppm, and may be configured to reduce a concentration of hydrogen below or about 400 ppm, below or about 300 ppm, below or about 200 ppm, below or about 100 ppm, below or about 50 ppm, below or about 30 ppm, below or about 20 ppm, below or about 10 ppm, below or about 1,000 ppb, below or about 100 ppb, or less.

The system may also reduce a fraction of hydrogen or any other component either as a percentage of the total amount of the component, or as a fraction of the effluent vapors. For example, hydrogen may be included in the effluent vapors at a concentration of greater than or about 10% of the total volume of materials within the effluent, and may be greater than or about 20%, greater than or about 30%, or more. The present technology may reduce the volume fraction to less than or about 20%, less than or about 15%, less than or about 10%, less than or about 5%, less than or about 1%, or may substantially or essentially remove the hydrogen or other component from the system. Additionally, the system may remove greater than or about 50% of produced hydrogen, and may remove greater than or about 60%, greater than or about 70%, greater than or about 80%, greater than or about 90%, greater than or about 95%, greater than or about 99%, or may substantially or essentially remove all of the component.

The present technology may reduce or remove an amount of carbon monoxide. For example, the effluent vapors may include a concentration of carbon monoxide that is greater than or about 500 ppm, and may be greater than or about 600 ppm, greater than or about 700 ppm, greater than or about 800 ppm, greater than or about 900 ppm, greater than or about 1000 ppm, greater than or about 1200 ppm, or greater. The oxidant 225 and flow path from a battery cell block 205 to the outlet 215, may be configured to reduce a concentration of carbon monoxide below or about 500 ppm, and may be configured to reduce a concentration of carbon monoxide below or about 400 ppm, below or about 300 ppm, below or about 200 ppm, below or about 100 ppm, below or about 50 ppm, below or about 30 ppm, below or about 20 ppm, below or about 10 ppm, below or about 1,000 ppb, below or about 100 ppb, or less, and may substantially or essentially remove any carbon monoxide from the produced effluent vapors in embodiments.

The system may also reduce a fraction of carbon monoxide either as a percentage of the total amount of the component, or as a fraction of the effluent vapors. For example, carbon monoxide may be included in the effluent vapors at a concentration of greater than or about 10% of the total volume of materials within the effluent, and may be greater than or about 20%, greater than or about 30%, or more. The present technology may reduce the volume fraction to less than or about 20%, less than or about 15%, less than or about 10%, less than or about 5%, less than or about 1%, or may substantially or essentially remove the carbon monoxide from the system. Additionally, the system may remove greater than or about 50% of produced carbon monoxide, and may remove greater than or about 60%, greater than or about 70%, greater than or about 80%, greater than or about 90%, greater than or about 95%, greater than or about 99%, or may substantially or essentially remove all of the component before the remaining effluent is delivered to the system outlet.

Figure 3A:
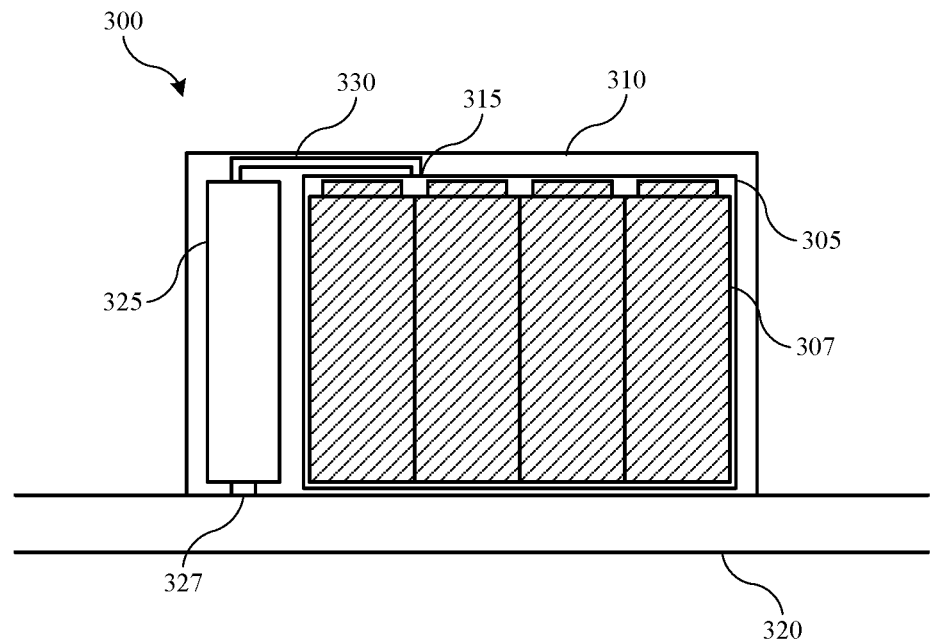
FIG. 3A shows a schematic cross-sectional view of an energy storage system according to embodiments of the present technology.

FIG. 3A shows a schematic cross-sectional view of an energy storage system 300 according to embodiments of the present technology. Energy storage system 300 may be similar to energy storage systems 100 or 200, and may include any of the components discussed above with regard to those systems. Energy storage system 300 may be or include a battery system including a cell block 305. Cell block 305 may include one or more battery cells 307. Although four battery cells 307 are shown, it is to be understood that cell block 305 may include more or less cells in embodiments. Cell block 305 may be included with a support structure 310 as previously described. Support structure 310 may contain the cell block 305, and may define or include a plenum 320 positioned beneath the cell block 305. In some embodiments, the plenum may be positioned about the cell block, and may not be limited to space below the cell block 305.

Cell block 305 may have a vent 315 associated with the cell block, and vent 315 may be configured to receive effluent vapors from the battery cell block. The vent may be in fluid communication with a vessel 325, which in embodiments may include or contain any materials previously discussed including an oxidant. Vessel 315 may be included within the cell block housing, or vessel 315 may be positioned adjacent or proximate the cell block 305. A channel 330 may be defined between the battery cell block 305 and the vessel 325 in embodiments. Channel 330 may be configured to deliver effluent vapors from the battery cell block 305 to the vessel 325, which may deliver treated effluents to plenum 320 through outlet 327. In embodiments, the effluents delivered from outlet 327 may be abated to any of the numbers discussed above for any constituent component of the effluent vapors. Additionally, in some embodiments energy storage system 300 may have multiple stages of abatement where vessel 325 is a first stage abatement. Vessel 325 may be combined with energy storage system 100 in embodiments to effect greater compositional adjustments to the effluents by utilizing multiple materials throughout the system.

Vessel 325 may include any oxidant or combination of oxidant materials as previously described. Additionally, vessel 325 may include oxidants within a sealed environment that may have reduced water content or may be under vacuum. For example, vessel 325 may include a sealed vessel having a barrier between the vessel and the battery cell block 305. The barrier may be or include channel 330, which may have pressure or temperature sensitive seals at either end. Vent 315 may also be a barrier to channel 330 and vessel 325, which may be under vacuum or other environmental constraints in embodiments. Vent 315, channel 330, or a barrier at the entrance of vessel 325 may be a temperature or pressure release barrier that provides access to a controlled environment within vessel 325. Outlet 327 may similarly be a temperature or pressure release barrier that provides access to plenum 320. The temperature or pressure sensitive barriers may be configured to release at a pressure between about 3 kPa to about 110 kPa in embodiments, and may be configured to release at a temperature between about 50° C. and about 900° C., between about 100° C. and about 800° C., or between about 150° C. and about 700° C. Smaller ranges within the stated ranges are also specifically encompassed.

Figure 3B:
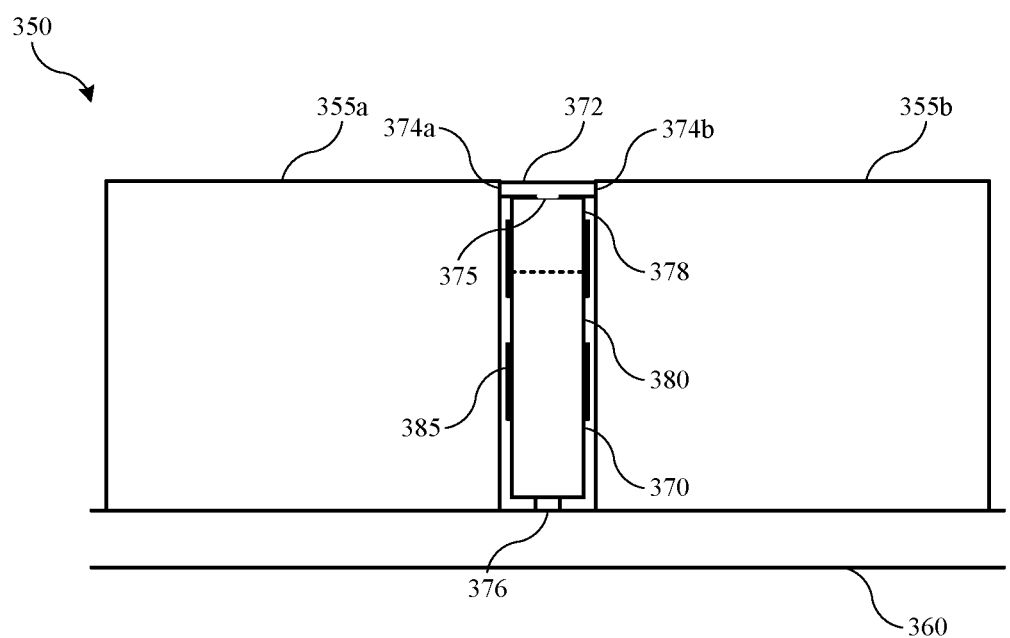
FIG. 3B shows a schematic cross-sectional view of an energy storage system according to embodiments of the present technology.

FIG. 3B shows a schematic cross-sectional view of an energy storage system 350 according to embodiments of the present technology. Energy storage system 350 may be similar to any of the previously discussed energy storage systems, and may include some or all of the previously described components. Energy storage system 350 may include cell blocks 355a, 355b in some embodiments, and may include any number of cell blocks, each including any number of cells, as previously described. Energy storage system 350 may include a plenum 360 as previously described, and may include any amount of support structure to contain the cell blocks, define the plenum, or incorporate any other components.

Energy storage system 350 may include a vessel 370, which may have one or more materials contained within, including an oxidant in embodiments. Vessel 370 may be positioned proximate or between cell blocks 355a-b, which allows the vessel 370 to be accessible by more than one cell block in an event that may release effluent vapors. Positioned in communication with each component may be a channel 372 that may provide access to each cell block 355 as well as an entrance 375 to vessel 370. The channel 372 may or may not be held under an adjusted atmosphere, such as under vacuum, water tight, heated, cooled, etc. Channel 372 may include two separate channels directed towards entrance 375 to prevent effluent vapors from one cell block from accessing another cell block, or channel 372 may include one or more devices or characteristics to limit interaction of effluent vapors between the cell blocks, such as a barrier proximate the midpoint of the channel 372 to prevent flow from passing the entrance 375.

Channel 372 may include one or more devices creating a barrier between the cell blocks 355 and the vessel 370 in embodiments. For example, a pressure sensitive or temperature sensitive barrier may be included at interfaces 374a, 374b between the cell blocks 355 and the channel 372. An additional or alternative barrier may be positioned at entrance 375 in embodiments. Vessel 370 may also be characterized by an outlet 376 from the vessel configured to deliver treated effluents to plenum 360. Outlet 376 may also be pressure or temperature sensitive, and may be breached by effluents within the vessel 370 after interaction with a material contained within the vessel. Vessel 370 may be configured to maintain a particular pressure drop across the vessel 370 in embodiments, and may add pressure up to or about 100 kPa in embodiments, but may increase a pressure drop by less than or about 100 kPa, less than or about 80 kPa, less than or about 60 kPa, less than or about 50 kPa, less than or about 40 kPa, less than or about 30 kPa, less than or about 20 kPa, less than or about 10 kPa, less than or about 5 kPa, or less in embodiments to minimize added pressure through the energy storage system.

In some embodiments, vessel 370, or any of the other systems discussed elsewhere in this disclosure, may include multiple oxidants in a structured arrangement. For example, vessel 370 may include a first region 378 and a second region 380 within the vessel. In some embodiments the first region may be proximate or adjacent entrance 375, while the second region may be proximate or adjacent outlet 376. The regions may be any amount of space within the vessel, and only a single example is included in the illustration. For example, the first and second regions may be any amount of vertical space within the vessel 370, and may be in communication along the vessel as well. For example, the first region 378 may include a first material, such as an oxidant, at a first position radially outward from a central axis through the vessel 370. The second region 380 may include a second material, and may be at a second position radially outward from the first position to create a layered structure of materials within the vessel. Any number of other variations or incorporations are also encompassed by the present technology as would be understood by the skilled artisan.

Including one or more oxidants or materials within the vessel 370 may allow targeting of multiple components of the effluent vapors, or may allow activation of the effluent vapors in embodiments. For example, a more active oxidant may be incorporated within the first region 378 of vessel 370, which may be configured to heat the effluent vapors above a discharge temperature from the cell blocks 355. On interaction with the oxidant within the first region 378, the temperature of the effluent vapors may be raised above or about 200° C., and may be raised to a temperature greater than or about 300° C., greater than or about 400° C., greater than or about 500° C., greater than or about 600° C., greater than or about 700° C., greater than or about 800° C., greater than or about 900° C., greater than or about 1000° C., greater than or about 1100° C., greater than or about 1200° C., greater than or about 1300° C., greater than or about 1400° C., greater than or about 1500° C., or higher in embodiments.

By heating the effluent vapors during the abatement or adjustment, additional reactions may be performed, additional efficiency of oxidation may be achieved, and the increased temperature may provide additional efficiency for a second oxidant contained within second region 380 or elsewhere in energy storage system 350. The heat that may be generated within vessel 370 or during the interaction of the effluent vapors with one or more materials within vessel 370 may be distributed away from the vessel 370 in embodiments. For example, structural members 385 may be or include heat sinks configured to dissipate heat from the vessel structure. Structural members 385 may include ceramics, metals, or other materials configured to dissipate heat from vessel 370. Structural members 385 may also take any number of forms geometrically, and may be or include plates, fins, rods, grids, or other structures configured to dissipate heat from vessel 370.

Figure 4:
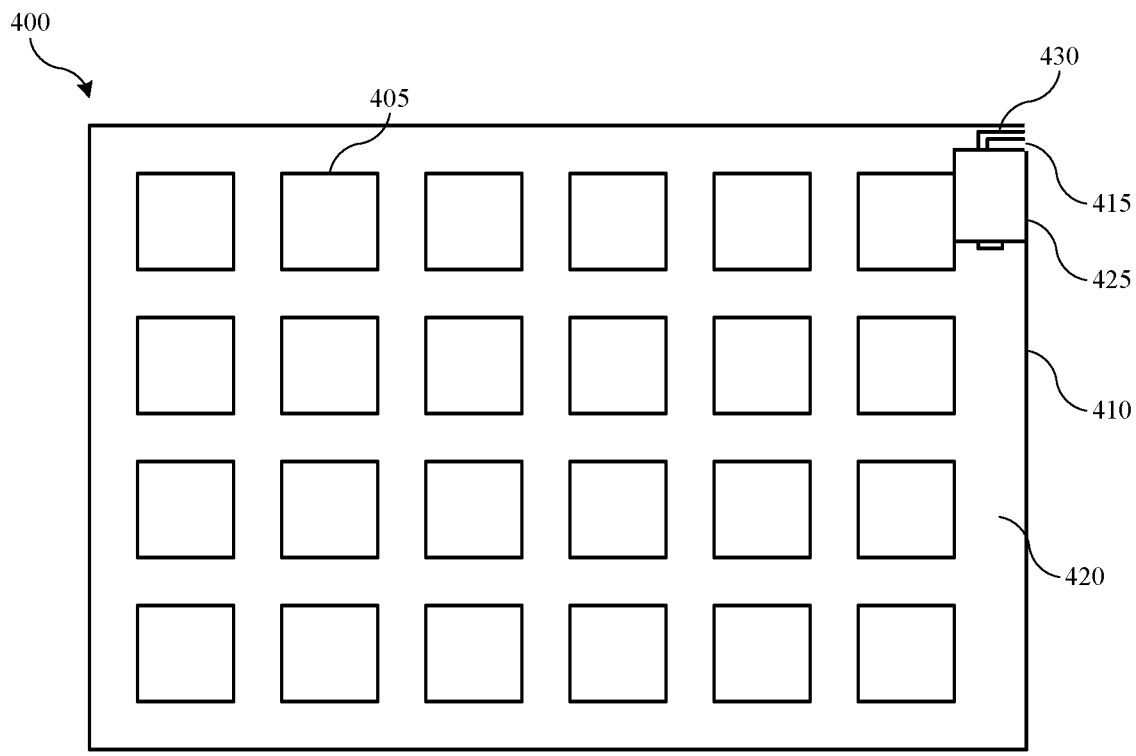
FIG. 4 shows a schematic top plan view of an energy storage system according to embodiments of the present technology.

FIG. 4 shows a schematic top plan view of an energy storage system 400 according to embodiments of the present technology. Energy storage system 400 may include some or all of the components of any of the previously discussed systems, and may be similar to energy storage system 200 discussed above, and may include any of the materials, characteristics, or configurations of that system. Energy storage system 400 may include, for example, a plurality of cell blocks 405, which may include any number of internal cells within each block. Cell blocks 405 may be incorporated or housed within support structure 410, which may define an outlet 415 and/or a plenum 420 as previously described. Energy storage system 400 may also include a vessel 425 including one or more oxidants or materials as discussed above.

Vessel 425 may be positioned within plenum 420 in some embodiments. Vessel 425 may be included in addition to or as an alternative to any of the other described vessels. For example, a first vessel may be positioned adjacent one or more cells, while vessel 425 may provide additional adjustment, attenuation, or abatement of effluent vapors. Vessel 425 may have or include a different material from any other vessel, or may include any of the previously discussed oxidants or materials. Vessel 425 may also be configured to adjust effluent vapors in one or more ways, including to reduce a temperature or pressure of the effluent vapors, or to provide any other type of adjustment. Vessel 425 may be positioned proximate outlet 415 in embodiments, and may receive effluent vapors that have distributed across a path defined within the plenum as previously described. Vessel 425 may have a directly coupled outlet with outlet 415, or may include an additional channel 430 distributing effluents from vessel 425 to outlet 415 in embodiments. In this way, outlet 415 may be used as a general system outlet for any other vapors produced, while vessel 425 may be maintained as a sealed vessel during normal system operation. If a cell block 405 vents effluent vapors into plenum 420, the effluent vapors may be at a temperature or pressure that may breach a barrier at an entrance to vessel 425, and may also breach a barrier at an exit of vessel 425 as previously described. Once the effluent vapors have been modified by materials within vessel 425, the treated vapors may be released from energy storage system 400 through outlet 415.

Figure 5:
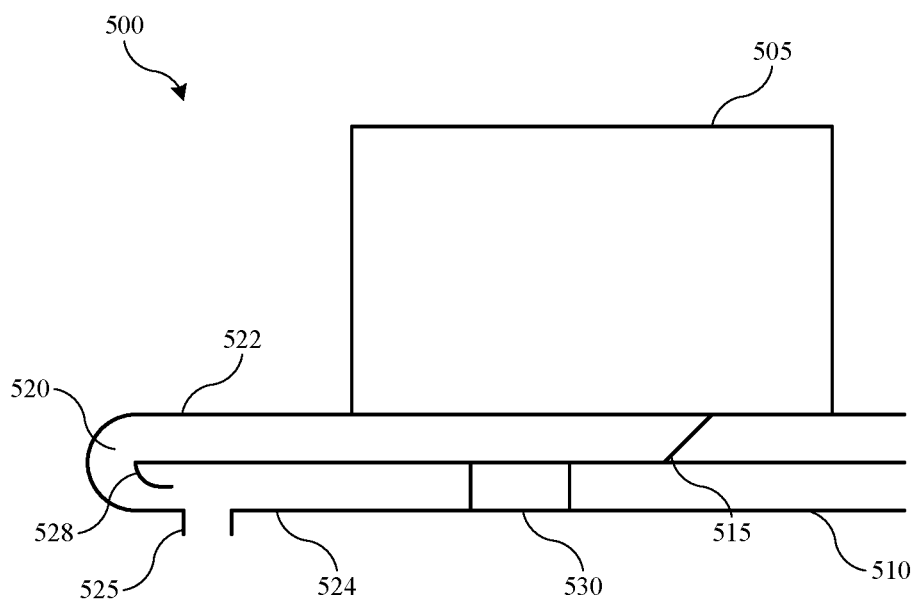
FIG. 5 shows a schematic cross-sectional view of an energy storage system according to embodiments of the present technology.

Turning to FIG. 5 is shown a schematic cross-sectional view of an energy storage system 500 according to embodiments of the present technology. Energy storage system 500 may include some or all of the components or characteristics discussed in any of the previously described energy storage systems. Energy storage system 500 may include a battery cell block 505, which may include any number of internal cells. Additionally, energy storage system 500 may include an array of cell blocks as previously described. Energy storage system 500 may include a support structure 510 configured to contain the battery cell block 505, and which may include a vent 515. Vent 515 may be part of the cell block 505 structure, or may be defined by the support structure 510, but may be positioned at an external portion of the battery cell block. Vent 515 may be configured to receive effluent vapors from the battery cell block 505 in embodiments, which may be generated by any of the constituent cells.

Energy storage system 500 may also include a plenum 520, which may be defined as part of the support structure 510 beneath the battery cell block. Plenum 520 may include or define an intake 525 configured to provide a fluid into the plenum. For example, the delivery may be to dilute the effluent vapors, and may be to incorporate an additional component with the effluent vapors, such as an oxygen-containing fluid. The oxygen-containing fluid may be air, water, or any other gases or liquids including an oxygen component. Intake 525 may be a passive or forced intake in embodiments. For example, intake 525 may be delivered from a fluid pump that may include or be in communication with one or more sensors. For example, when a sensor detects that a battery cell block 505 has released effluent vapors, a pump may engage and deliver an oxygen-containing fluid to plenum 520 to be mixed with the effluent vapors. Additionally, plenum 520 may be configured as illustrated to draw an oxygen-containing fluid into the effluent vapors.

In some embodiments plenum 520 may include multiple sections, including a first section 522, and a second section 524. The first portion 522 of the plenum 520 may define a portion of the plenum in fluid contact with vent 515. First portion 522 may receive effluent vapors from the battery cell block 505, and may direct the effluent vapors along the first portion in any of the ways previously described. First portion 522 may direct the effluent vapors to the second section 524 in embodiments. Second section 524 may be defined as a portion of the plenum 520 extending from the first section 522 as a continued fluid path. Intake 525 may be positioned, located, or defined in any of the first section 522, the second section 524, or between the first section 522 and the second section 524, and may be configured to provide the oxygen-containing fluid to the effluent vapors as the effluent vapors are delivered from the first section 522 to the second section 524.

A transition between first section 522 and second section 524 may provide a structure allowing or generating the intake of an oxygen-containing fluid from intake 525. For example, transition 528 may form a reduction in the plenum space between first section 522 and second section 524. This reduction may increase the fluid velocity of the effluent vapors as they pass intake 525. The increased velocity may cause a pressure drop across the intake 525, which may draw or entrain an oxygen-containing fluid into the effluent stream. For example, intake 525 may be a port to atmosphere or some other environment. The pressure drop across intake 525 may draw air into the energy storage system 500, adding oxygen into the effluent stream. Based on the velocity, pressure, effluent vapor characteristics, and intake fluid characteristics, a pre-determined amount of oxygen-containing fluid may be entrained with the effluent vapors. This oxygen may be included or incorporated prior to the effluent vapors contacting a material 530 positioned within the plenum.

Material 530 may include any of the materials previously discussed including an oxidant, a catalyst, or any other material. In some embodiments material 530 may be or include an oxidant either along the plenum 520 or included within a vessel as previously discussed. In some embodiments material 530 may be or include a catalytic material configured to catalyze reactions between the entrained oxygen-containing fluid and components of the effluent vapors, such as carbon monoxide and hydrogen. The catalytic material may be included in the second section of the plenum downstream from the intake 525.

Various catalytic materials may be used that are or include platinum, palladium, nickel, or other metals, including transition metals, oxides, or other components. The material 530 may include a combination of materials in a structured arrangement such as previously described, and may include a combination of catalytic materials and oxidants in embodiments. In some embodiments the catalytic materials may not be depleted by the reaction, but in some embodiments the reaction may at least partially consume the catalytic material. The material 530 may be layered within the plenum or lined along the plenum walls, or may be included in a structured shape with fluid paths through the material. Material 530 may be heated or unheated in embodiments. For example, the effluent vapors may be at a sufficient temperature upon contacting material 530 to cause constituent reactions to occur. In some embodiments, a heating element, such as a resistive heater, may be incorporated with material 530, and may be engaged when a sensed release of effluent vapors has occurred from battery cell block 505.

FIG. 5 illustrates an exemplary plenum structure, although it is to be understood that additional plenum configurations may be included. For instance, FIG. 6A shows a partial cross-sectional view of a plenum structure 600 according to embodiments of the present technology. Plenum structure 600 may include a defined space, which may be defined by support structure 620. FIG. 6A illustrates plenum structure 600 including an intake 625, a transition 628, and a material 630, such as an oxidant, catalytic material, combination, or other material as previously described. Plenum 600 may be used with any of the previously discussed systems. As shown, plenum structure 600 may not include a first portion and second portion in a stacked arrangement as previously illustrated. In some embodiments, plenum structure 600 may include a configuration that arranges the first and second section laterally from one another as discussed further below.

FIG. 6B shows a schematic partial cross-sectional view along line A-A of FIG. 6A according to embodiments of the present technology. As shown, the plenum structure utilizes a corrugated arrangement that may include a support structure 620, which may define a first section 622 and a second section 624 in embodiments. First section 622 may be in fluid communication with a vent from one or more battery cell blocks as discussed above. Second section 624 may provide access to a material 630 configured to interact with the effluent vapors after an oxygen-containing fluid has been entrained within the effluent vapor stream from intake 625. Such an arrangement may include one intake 625, or may have a separate air intake 625 in each defined second section 624, which may also each include an individual material 630. Material 630 may be a structure positioned within the second section 624, or may be lined along one or more surfaces of each second section 624 as previously described. In embodiments each first section 622 and each second section 624 may be fluidly isolated from one another. In other embodiments each first section 622 and/or each second section 624 may be in fluid communication with each other similar section.

Any of the previous designs may also utilize a strategy of diluting effluent vapors or igniting effluent vapors in addition to or as an alternative to any of the previously described embodiments. FIG. 7 shows a schematic plan view of an outlet structure 700 according to embodiments of the present technology. Outlet structure 700 may be a portion of a plenum of any of the previously discussed designs, and may be a portion of a second section of a plenum, such as located downstream of an air entrainment arrangement as discussed above with FIG. 5. Outlet structure 700 may be positioned downstream of an oxidant material, a catalytic material, or any other material configured to interact with the effluent vapors.

As illustrated, outlet structure 700 may include a support structure 710 defining a plurality of apertures 715 through the structure. The apertures may be exit ports from a plenum or contained environment to provide access to an external environment to allow the release of effluent vapors, which may have been diluted with entrained fluid as discussed previously. The apertures 715 may also allow egress of an ignited effluent vapor in embodiments. Depending on the constituents of the effluent vapor, an oxygen-containing fluid may or may not be entrained, injected, or otherwise incorporated with the effluent vapors. One or more apertures 715 may have an associated ignition device 720, which may be configured to ignite the effluent vapors proximate the exit ports 710. For example, one or more exit ports may include an ignition device 720, which may include a resistive element, a pyrophoric element, a piezoelectric element, or any other mechanism for igniting effluent vapors. The ignition device 720 may be configured to create a temperature or pressure barrier along the apertures 715, which may be breached by effluent vapors. This may expose a pyrophoric component, or may engage any other ignition device. Additionally, the ignition device may be positioned directly upstream of the plurality of apertures 715, and configured to ignite the effluent vapors prior to their release through apertures 715.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. For example, embodiments of components described above may be incorporated into battery packs including stacked designs such as bipolar and mono-cell stack batteries. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system, comprising:
   a battery cell;
   a support structure configured to contain the battery cell;
   a plenum defined by a portion of the support structure positioned beneath the battery cell;
   a vent within the plenum, wherein the vent comprises a hinge coupled to the support structure, the vent configured to open at a first end opposite the hinge and contact a floor of the plenum at the first end opposite the hinge to form an angled path into the plenum beneath the battery cell, wherein the first end of the vent contacts the floor of the plenum at a contact point to form the angled path; and
   an oxidant located within the plenum and positioned adjacent the contact point to interact with effluent vapors distributed from the battery cell into the plenum.

2. The battery system of claim 1, wherein the vent is configured to receive the effluent vapors.

3. The battery system of claim 2, wherein the hinge is configured to release at a defined pressure and deliver the effluent vapors into a defined path of the plenum.

4. The battery system of claim 1, wherein the oxidant comprises a metal oxide.

5. The battery system of claim 1, wherein the oxidant lines a base of the plenum.

6. The battery system of claim 1, wherein the plenum defines a flow path from the vent defined beneath the battery cell to an outlet of the battery system, and wherein the path is characterized by a length of at least 1 m.

7. The battery system of claim 6, wherein the oxidant is located within the plenum along the flow path, wherein the effluent vapors are flammable, and wherein the oxidant comprises a chemical composition that reacts with the effluent vapors to produce a non-flammable effluent at the outlet.

8. The battery system of claim 1, wherein the oxidant is characterized by a surface area greater than or about 200 $m^2/g$.

9. The battery system of claim 1, wherein the oxidant is configured to reduce a carbon monoxide concentration within the effluent vapors from above or about 1000 ppm to below or about 100 ppm.

10. The battery system of claim 1, wherein the oxidant is positioned below the battery cell.

11. The battery system of claim 1, wherein the angled path directs the effluent vapors to the oxidant.

* * * * *